United States Patent [19]
Krude et al.

[11] Patent Number: 5,542,885
[45] Date of Patent: *Aug. 6, 1996

[54] CONSTANT VELOCITY UNIVERSAL BALL JOINT WITH CAGE SECURING ELEMENTS

[75] Inventors: Werner Krude, Neunkirchen-Wolperath; Peter Harz, Hennef, both of Germany

[73] Assignee: GKN Automotive AG, Lohmar, Germany

[ * ] Notice: The term of this patent shall not extend beyond the expiration date of Pat. No. 5,453,052.

[21] Appl. No.: 129,140

[22] PCT Filed: Feb. 4, 1993

[86] PCT No.: PCT/EP93/00253

§ 371 Date: Oct. 4, 1993

§ 102(e) Date: Dec. 3, 1993

[87] PCT Pub. No.: WO93/16296

PCT Pub. Date: Aug. 19, 1993

[30] Foreign Application Priority Data

Feb. 5, 1992 [DE] Germany .......................... 42 03 195.8

[51] Int. Cl.⁶ .................................................. F16D 3/224
[52] U.S. Cl. .............................................. 464/145; 464/906
[58] Field of Search ..................... 464/145, 144, 464/143, 906

[56] References Cited

U.S. PATENT DOCUMENTS

| | | | |
|---|---|---|---|
| 4,116,020 | 9/1978 | Aucktor et al. | 464/464 |
| 4,120,176 | 10/1978 | Ebbinghaus | 464/905 |
| 4,575,362 | 3/1986 | Girguis | 353/145 |
| 4,915,672 | 4/1990 | Girguis | 464/145 |

FOREIGN PATENT DOCUMENTS

| | | | |
|---|---|---|---|
| 2430027B1 | 5/1975 | Germany . | |
| 2522670B1 | 5/1976 | Germany . | |
| 3132363C1 | 1/1983 | Germany . | |
| 2602074C2 | 10/1984 | Germany . | |
| 3626998A1 | 2/1988 | Germany . | |
| 3233753C2 | 6/1990 | Germany . | |
| 4211170 | 10/1993 | Germany | 464/145 |
| 4303901 | 10/1993 | Germany | 464/145 |

*Primary Examiner*—Daniel P. Stodola
*Assistant Examiner*—Eileen A. Dunn
*Attorney, Agent, or Firm*—Harness, Dickey & Pierce

[57] ABSTRACT

A homokinetic ball turning joint has a joint outer part (1a) with ball tracks (6a) distributed around its circumference that extend substantially in the longitudinal direction and a joint inner part (11a) with ball tracks (13a) distributed around its circumference that extend substantially in the longitudinal direction. The tracks (6a, 13a) are arranged in pairs, lie opposite each other in the radial direction and carry together a torque transmitting ball (14a). A cage (7a) receives the ball (14a) in windows (15a) distributed around the circumference, retains it in a common plane and when the axes of the joint outer part (1a) and joint inner part (11a) are bent towards each other, it guides the balls (14a) onto the angle bisecting plane. The joint outer part (1a) has inner surfaces (5a) with no undercuts located between the individual ball tracks (6a), when viewed in the axial direction. Retaining elements linked to the joint outer part (1a) form cage guiding surfaces (16a) which prevent the cage (7a) from moving out of the joint outer part (1a) in the axial direction. At least two independent retaining elements (9a) for the cage (7a) are inserted into the joint outer part (1a), each between two ball tracks (6a), and are soldered to the joint outer part (1a).

19 Claims, 11 Drawing Sheets

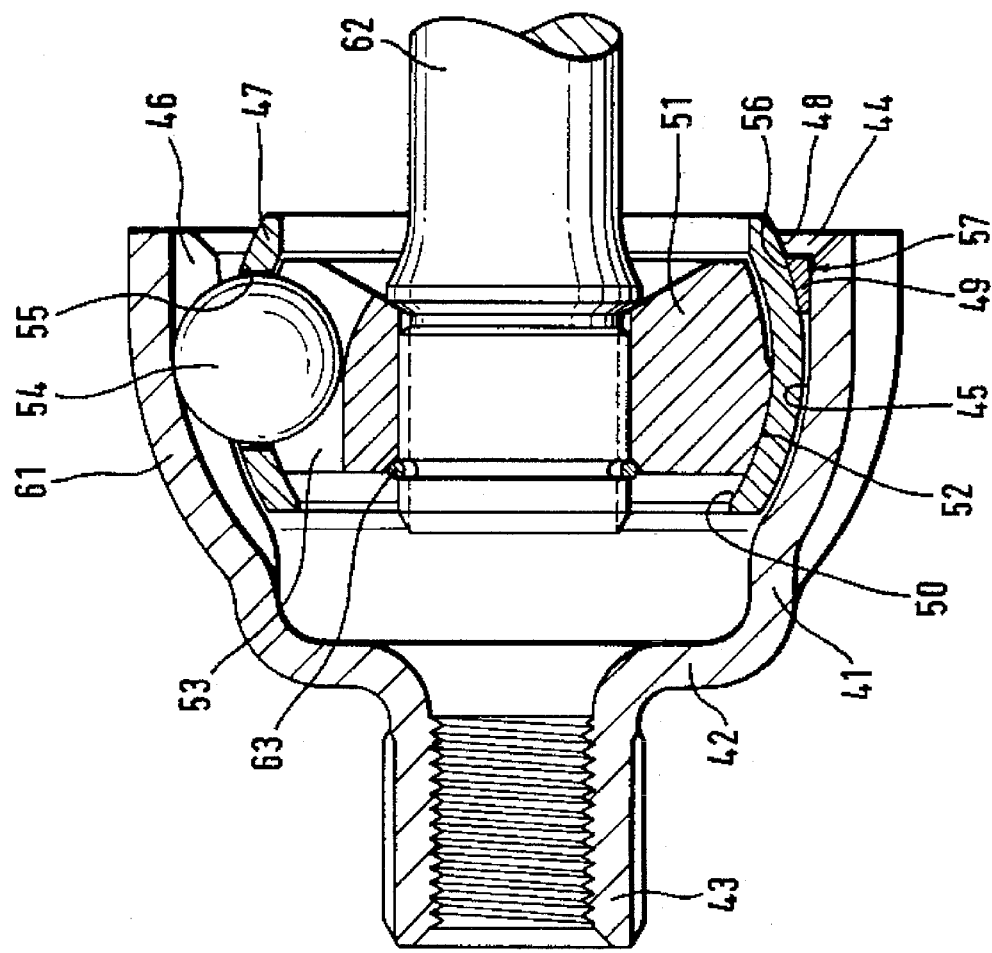
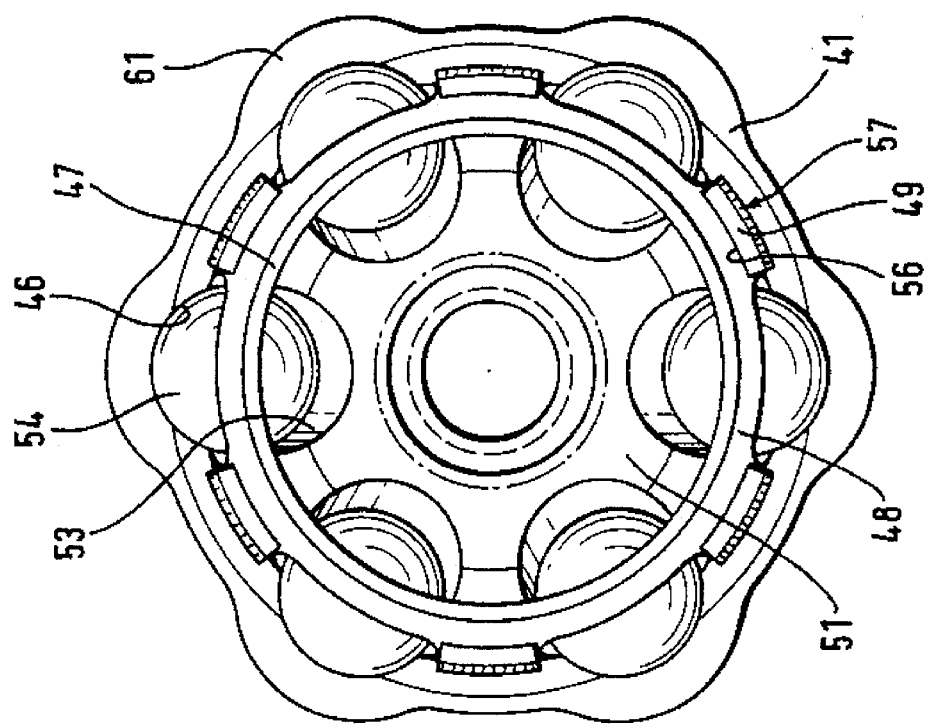
Fig. 20
Fig. 19

5,542,885

CONSTANT VELOCITY UNIVERSAL BALL JOINT WITH CAGE SECURING ELEMENTS

BACKGROUND AND SUMMARY OF THE INVENTION

The invention relates to a constant velocity universal ball joint. The joint has an outer joint part with substantially longitudinally extending circumferentially distributed ball tracks and an inner joint part with substantially longitudinally extending circumferentially distributed ball tracks. The tracks are arranged in pairs radially opposite one another and jointly receive a torque transmitting ball. A cage, which receives the balls in circumferentially distributed windows, holds the balls in a common plane and which, upon articulation of the axes of the outer and inner joint parts, guides the balls on to the angle-bisecting plane, with the outer joint part being produced with surfaces between the individual tracks, which, if viewed in the axial direction, constitute undercut-free inner surfaces. At least three cage securing elements are inserted into the outer joint part in each case between two ball tracks, are connected to the outer joint part and form cage contact and cage guiding faces which counter-act any axial movement of the cage out of the outer joint part. The balls are able to move into gaps between the securing elements.

The subject of the invention can be applied to different types of constant velocity universal ball joints, especially to so-called RF joints (Rzeppa fixed joints) and the so-called UF-joints (undercut-free joints). Joints of this type are described in F. Schmelz et al, "Gelenke und Gelenkwellen: Berechnung, Gestaltung, Anwendungen" (Joints and driveshafts: calculation, design, applications), Berlin, Heidelberg, New York 1988 under said headings. In these joints, the cage is not or not entirely controlled by the shape of the cage guiding faces, but primarily by the shape of the ball tracks in the outer joint part and inner joint part, with the centre lines of the ball tracks deviating from one another, but extending symmetrically to a plane defined by the ball centres when the joint is in the extended position.

A joint of the above type is illustrated DE 32 33 759 C 2 where the securing elements are provided in the form of bolts threaded almost radially into the outer joint part. Both the method of preparing the outer joint part for receiving the said securing elements and setting the play are cost- and time-consuming operations. As the outer joint part requires a sufficient amount of material to receive the securing means, the outer joint part has to have a relatively great axial length with reference to the plane extending through the ball centres of an extended joint, which length limits the joint articulation angle in respect of the possible freedom of movement of the connected shaft when the joint is in an articulated condition. A joint of the above type is also shown in DE 24 30 027 B1 in which case the securing means are inserted axially and secured jointly by a securing ring inserted into an annular groove in the outer joint part. The securing ring obstructs the possible ball travel in the tracks in the outer joint part so that a limited joint articulation angle has to be accepted. In the same way, the securing ring limits the articulation angle in respect of the possible freedom of movement of the connected shaft when the joint is in the articulated condition. The cage, in this case, is supported inside the outer joint part on resiliently held further stop means. If the joint which is to act as a fixed joint is subject to greater thrust forces, such a solution is unsuitable because the joint function of an axially fixed joint centre is not complied with.

Furthermore, a joint of a similar type is known from DE 36 26 998 A 1 where the only securing element is a securing ring inserted into an inner groove in the outer joint part. It is not possible to adjust the play at the cage for the purpose of compensating for manufacturing tolerances. The securing ring inserted into the outer joint part after the inner joint part including the cage and balls, have been assembled in the form of a complete unit is disadvantageous in that the articulation angle of the joint is limited considerably. On the one hand, the ball travel in the tracks is limited by the inserted securing ring and on the other hand, the securing ring forms a stop for a shaft associated with the inner joint part.

A further joint of a similar type is known from DE 25 22 670 B 1 in which case the securing element consists entirely of an annular member positioned on the end face of the outer joint part, having individual inwardly deformed tongues and held by a plate metal cap. Again, the annular member restricts the articulation angle of the joint in that it forms a stop for a shaft associated with the inner joint part when the joint is articulated. As the annular member has to be preformed, an axial adjustment of play is not possible. The individual tongues are not able to accommodate greater axial drag forces so that the joint function as a fixed joint with a fixed joint centre is not observed.

It is the object of the invention to provide a joint of the above type in the case of which the maximum articulation angle is not adversely affected by the securing elements for the cage and where the securing elements may be used for setting the axial play at the cage. The objective is achieved in that the securing elements are formed by independent wedges which are axially inserted into the annular gap between the outer joint part and the outer face of the cage, which are fixed especially welded to the outer joint part and which, with a set axial play, hold the cage in the outer joint part by means of contact in contact points A. In the case of a joint with six balls for example, it is possible for three securing elements with two ball tracks arranged between two of them, respectively, to be uniformly circumferentially distributed.

With this design it is possible, in an advantageous way, prior to fitting the securing elements, to insert the cage into the outer joint part with the cage axis being positioned coaxially relative to the axis of the outer joint part, with the securing elements then being inserted into, and connected to the outer joint part. In this way, the usually complicated operation of introducing the cage into the outer joint part is avoided. As explained above, the inner joint part and cage may be preassembled and jointly introduced coaxially into the outer joint part. As the tracks are axially undercut-free towards the aperture of the outer joint part, the balls,too, may form part of the assembled group of cage and inner joint part, which then, in its entirety, is axially introduced into the outer joint part. At the same time, as a result of the method of assembly, the entire joint may be adjusted so as to be axially play-free or comprise a small predetermined amount of play independently of the production tolerances.

According to a preferred embodiment, the radii of curvature of the tracks are axially offset oppositely relative to a plane $E_K$ through the amount of ball centres of the extended joint, the amount of offset $O_1$ of the inner joint part being permitted to deviate from the offset $O_2$ of the outer joint part. When the joint is articulated, the cage is controlled primarily by means of the ball tracks and balls so that it is possible for the cage to be relatively light with a uniform wall thickness.

A first variant of the invention includes the inner surface between the tracks in the outer joint part forming cage contact and cage guiding faces against which the cage, in contact points E, is supported axially inwardly on the outer joint part. This constitutes a particularly simple way of axially securing the cage. As already described, the securing elements may be welded on while directly contacting the cage or after a small axial play has been set after a reference position has been found due to the securing elements axially contacting the cage.

In a further embodiment of the above-mentioned variant, the inner joint part is axially inwardly supported in the outer joint part by means of its outer face on the inner face of the cage and thus indirectly by means of the cage. It is axially outwardly supported in the outer joint part by means of its tracks on the balls and thus indirectly by means of the balls and cage and by means of the securing elements.

By deviating from the above, the inner joint part may be axially inwardly and outwardly supported in the outer joint part, in each case by means of its outer face on the inner face of the cage and thus indirectly by means of the cage and securing elements only. With this variant, no support is provided by the cage windows.

Irrespective of the shape of the axial support means, the balls, with the cage being held in the outer joint part in a play-free way, are to be held in the tracks in the outer joint part and inner joint part in a radially nearly play-free way.

In order to avoid any edge carriers after the cage has been fixed, after the securing elements have been inserted and secured, it is proposed that the centres $M_1$, $M_2$ of the cage contact and cage guiding faces at the securing elements and in the outer joint part are axially offset in opposite directions relative to a plane through the ball centres of the extended joint radii $R_1$, $R_2$ are greater than the radius R of the outer face of the cage.

A second variant of the invention is characterised in that the inner surface between the tracks in the outer joint part provides a radial play $S_3$ relative to the outer surface of the cage. Also the inner surface of the cage is in contact with contact points D of outer surfaces of the inner joint part positioned between the tracks. Further the cage, by means of the cage windows, is axially inwardly supported on the balls on contact points B on the flanks positioned towards the aperture of the outer joint part, said balls in turn are supported in contact points $C_1$, $C_2$ on the tracks of the outer joint part and of the inner joint part.

In this case, too, as explained above, assembly may lead to there being no axial play at all or it may be used for setting a desired amount of axial play, in which case again the axial play is initially set to zero in order to find a reference position. When there is no axial play, there is also no radial play for the balls because for support reasons the balls have to contact the tracks. Such contact may take place on the track base, but depending on the cross-sectional shape of the tracks, a double ball contact at the flanks of the respective tracks is also possible.

According to a further embodiment of the invention it is proposed that between the inner surface of the cage and the outer surface of the inner joint part, at the end positioned towards the aperture O of the outer joint part, there is provided a radial play $S_1$. Furthermore, it is proposed that when the balls contact the tracks on contact points $C_1$, $C_2$ and the cage windows in the contact points B, there exists an axial play $S_2$ relative to the flanks of the cage windows positioned towards the inside of the outer joint part. In this way it is possible to increase the size of the surface parts at the inner joint part and cage that remain unmachined. According to a further embodiment advantageous for both variants, the inner surface of the outer joint part, in the region of a plane $E_K$ through the ball centres of the extended joint and beyond said plane into the inside of the outer joint part, includes an inner cylindrical portion Z. In this way it is possible to prevent the cage from moving out radially in the course of the axial assembly operation described above on several occasions because the cage comes to rest against said the inner cylindrical face. Furthermore, the tendency of the outer joint part to deform under torque is limited because the outer joint part is supported by the inner cylindrical face on the cage.

According to a preferred embodiment, the ball tracks in the outer joint part and inner joint part, if viewed from the aperture end of the outer joint part, are axially undercut-free, thereby achieving the advantage during assembly in that the balls, too, may be pre-fitted together with the inner joint part and cage and that the assembled unit may be axially inserted into the outer joint part before the securing elements are finally fitted. As the length of the cage windows in the circumferential direction is determined by the path of the balls relative to the cage when the joint is articulated, which path increases with an increasing articulation angle, a joint in accordance with the invention permits the length of the windows in the circumferential direction to be limited. This means that the length of the windows in the circumferential direction merely needs to correspond to the path which is covered by the balls relative to the cage in the circumferential direction when the joint rotates at the operating angle. This means that there is no need for articulating the axes of the inner joint part and outer joint repeatedly until an assembly angle is reached at which a cage window freely emerges from the outer joint part to allow a ball to be inserted radially.

The individual securing elements allow the amount of play to be adjusted relative to the cage, at which amount of play the axial securing means may be adjusted individually and independently, thereby also achieving uniform load-bearing conditions between the surface of the securing elements and the outer surface of the cage.

According to an advantageous embodiment, the securing elements include simple wedges which are introduced into an annular surface of the outer joint part, which are made to contact the previously inserted cage and which, optionally prior to being connected to the outer joint part, are withdrawn by the amount of axial play to be set. The inner faces of the wedges facing the cage may include an inner curvature or an inner wedge shape in order to establish contact with the outer spherical cage.

To facilitate assembly, the inside of the outer joint part, in a further embodiment, may be provided with pockets or recesses which are engaged by the securing elements in a circumferentially form-fitting way. In this way, the circumferential position of the securing elements is observed more easily during assembly.

In a further advantageous embodiment, the recesses are designed in such a way that the securing elements, prior to being connected to the outer joint part, are movable therein so as to be axially and/or radially guided. A preferred design of such recesses refers to longitudinal grooves arranged at an angle relative to the axis, and the securing elements may be wedge-shaped, as mentioned above.

In a particularly advantageous embodiment, the outer joint part is a formed plate metal part with a substantially constant wall thickness, and it is particularly advantageous for such a part produced by deep-drawing to be axially completely undercut-free, with the individual welded-in axial securing elements axially supporting the cage.

BRIEF DESCRIPTION OF THE DRAWINGS

Preferred embodiments of the invention are illustrated in the drawing wherein:

FIG. 19 is an axial view of a joint produced as a formed plate metal part in accordance with the invention.

FIG. 20 is a longitudinal section view through a joint according to FIG. 19.

DETAILED DESCRIPTION OF THE PREFERRED EMBODIMENTS

Figure 2:
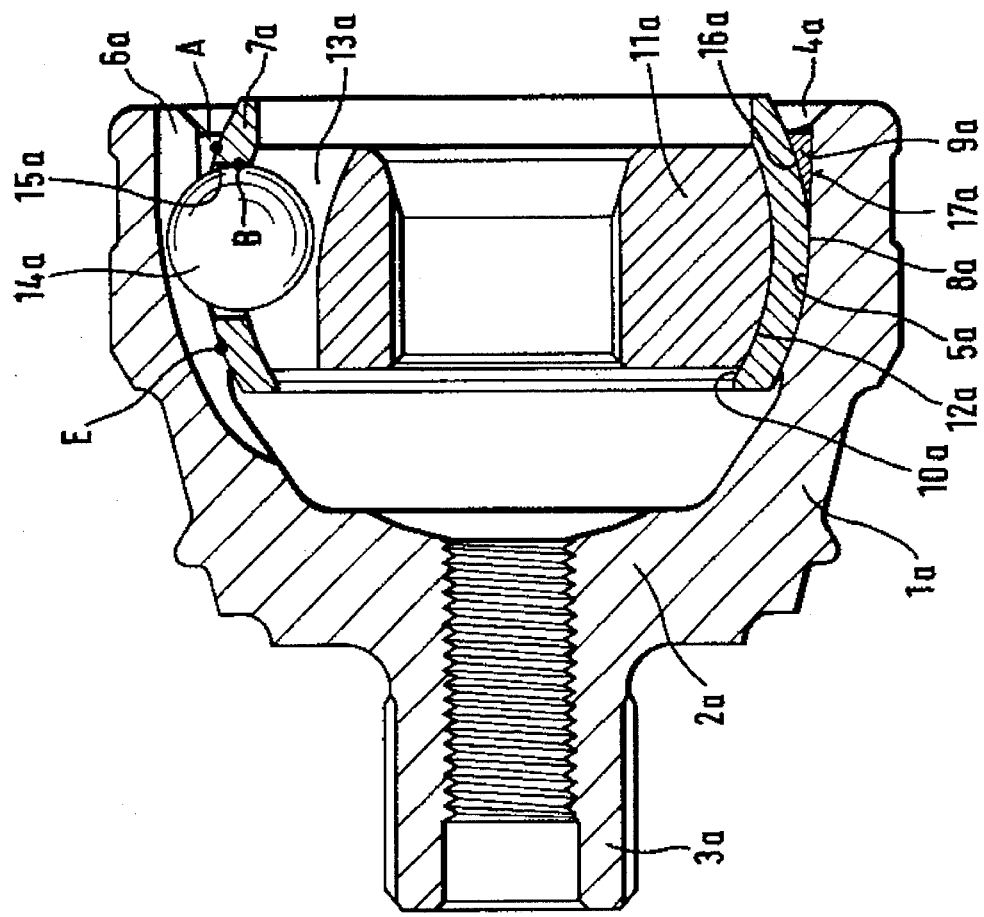
FIG. 2 is a longitudinal section view through a joint according to FIG. 1.
Figure 1:
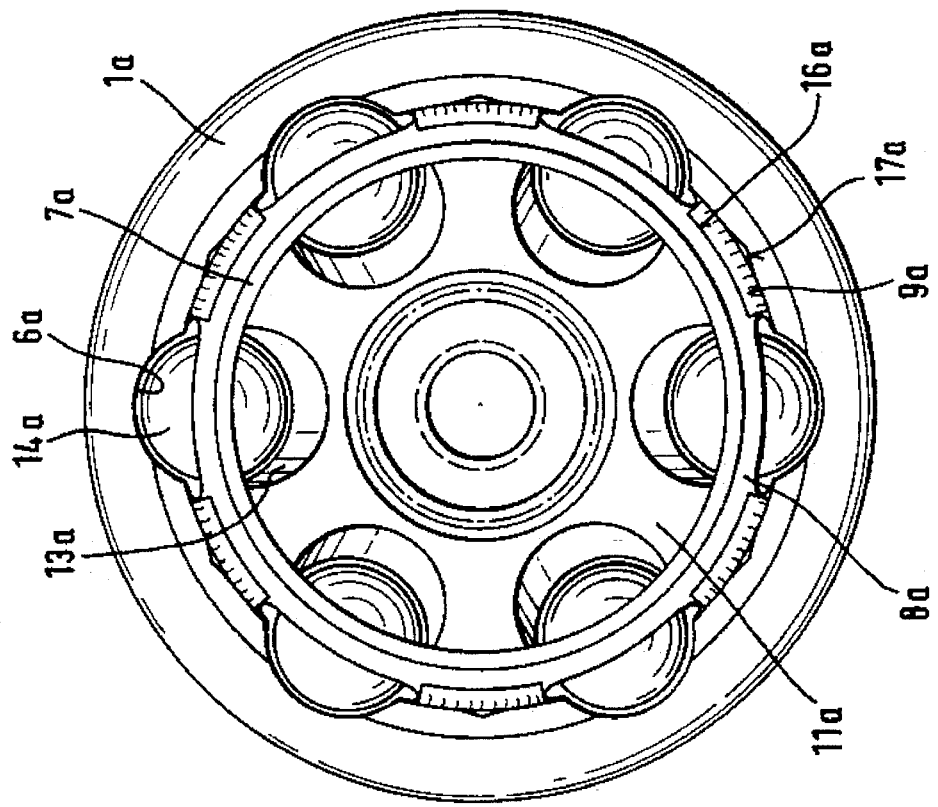
FIG. 1 is an axial view of a first embodiment of a joint in accordance with the invention.

FIGS. 1 and 2 each show a joint with an outer joint part 1a whose one end is closed by a joint base 2a followed by a journal 3a and whose opposite end includes an aperture 4a. If viewed from the aperture 4a, the inner face 5a of the outer joint part 1a is axially undercut-free. The same applies to the circumferentially distributed ball tracks 6a. A cage 7a with a spherical outer face 8a is introduced into the outer joint part 1a. The cage 7a is axially inwardly supported on contact points E on the inner face 5a of the outer joint part and axially outwardly it is supported on contact points A on individual securing elements 9a which have yet to be described in greater detail. The cage includes a spherical inner face 10a accommodating an inner joint part 11a with an outer surface 12a shaped like a spherical portion. Furthermore, the inner joint part 11a is provided with longitudinally extending tracks 13a which, if viewed axially from the aperture, are also undercut-free. The tracks 6a, 13a hold balls 14a which are axially supported on windows 15a in the cage. The individual securing elements 9a are inserted into wedge-shaped guiding grooves 17a in the outer joint part and include a spherical inner face 16a. The axis of the wedge-shaped grooves is inclined relative to the longitudinal axis of the outer joint part so that if the securing elements are axially displaced in the guiding grooves, they simultaneously approach the cage radially. As indicated in the axial view, the securing elements are connected to the outer joint part by a weld. The longitudinal section shows a front chamfer which at least corresponds to the respective chamfer of the aperture of the outer joint part.

Figure 2A:
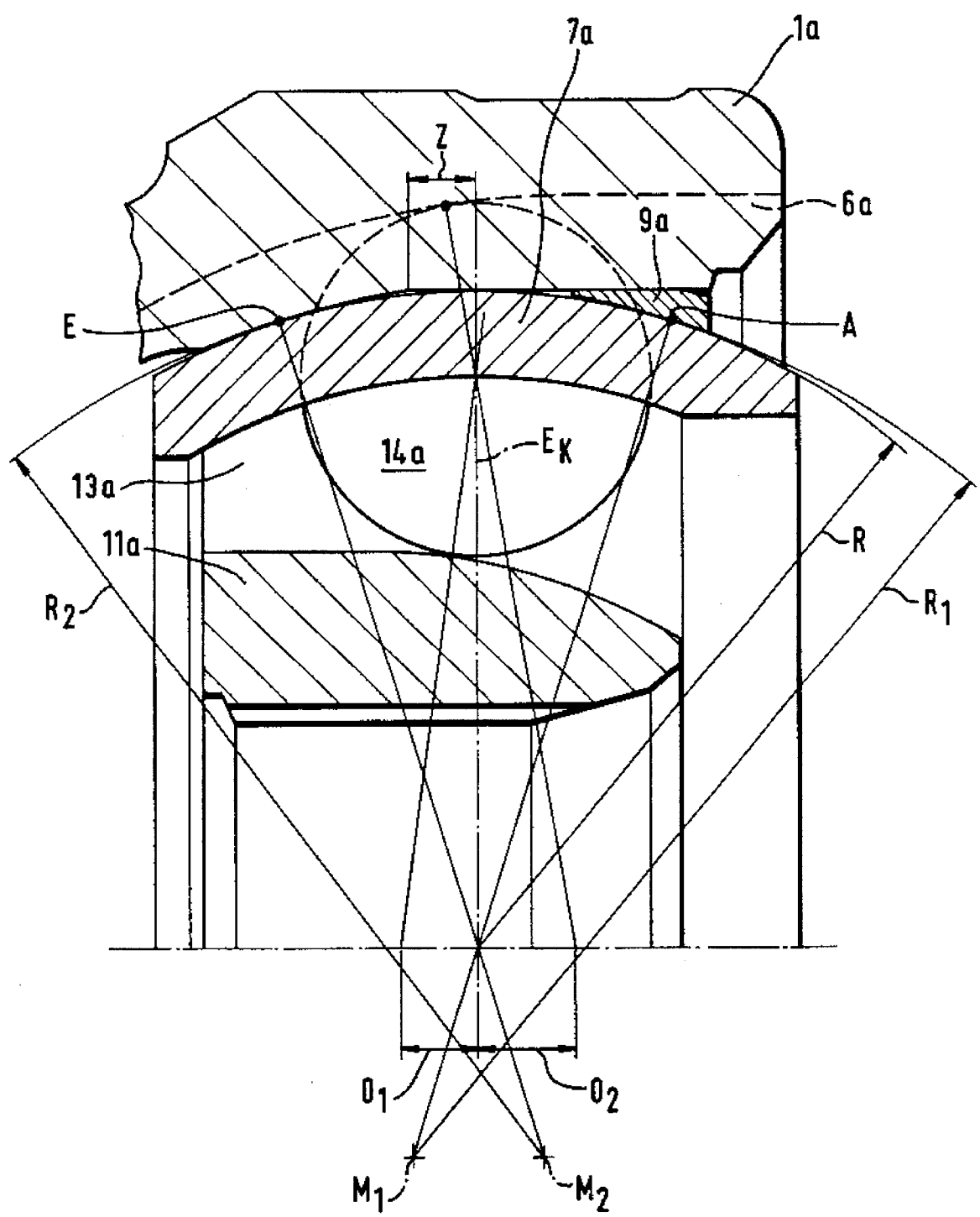
FIG. 2a shows an enlarged detail view of a joint according to FIG. 2.

FIG. 2a, in an enlarged view, shows the outer joint part 1a, the inner joint part 11a, the cage 7a and one of the securing elements 9a in a longitudinal section. In points E and A, the cage contacts the outer joint part and the securing element respectively. It can be seen that the centres $M_1$, $M_2$ of the spherical cage contact and cage guiding faces of the securing element 9a and of the outer part 1a are axially offset in different directions relative to a plane through the ball centres $E_K$ of the extended joint and that, furthermore, the radii of curvature $R_1$, $R_2$ of the spherical faces are approximately of the same length relative to one another and slightly greater than the radius R of the outer face of the cage 7a. It is also indicated that the inner face of the outer joint part 1a, from the plane $E_K$ through the ball centers of the extended joint as far as the inside of the joint, includes a cylindrical portion Z. Because the outer joint part is undercut-free, the inner cylindrical face continues towards the outside of the outer joint part at least with the same diameter.

$O_1$ refers to the so-called offset, the axial distance between the centre of the radius of curvature of the tracks 13a in the inner joint part not described in greater detail) and the joint centre, a plane $E_K$ through the ball centres, and $O_2$ refers to the offset (optionally deviating from $O_1$) of the centre of the radius of curvature of the tracks 6a in the outer joint part relative to the joint centre, the plane $E_k$ through the ball centres of the extended joint.

Figure 4:
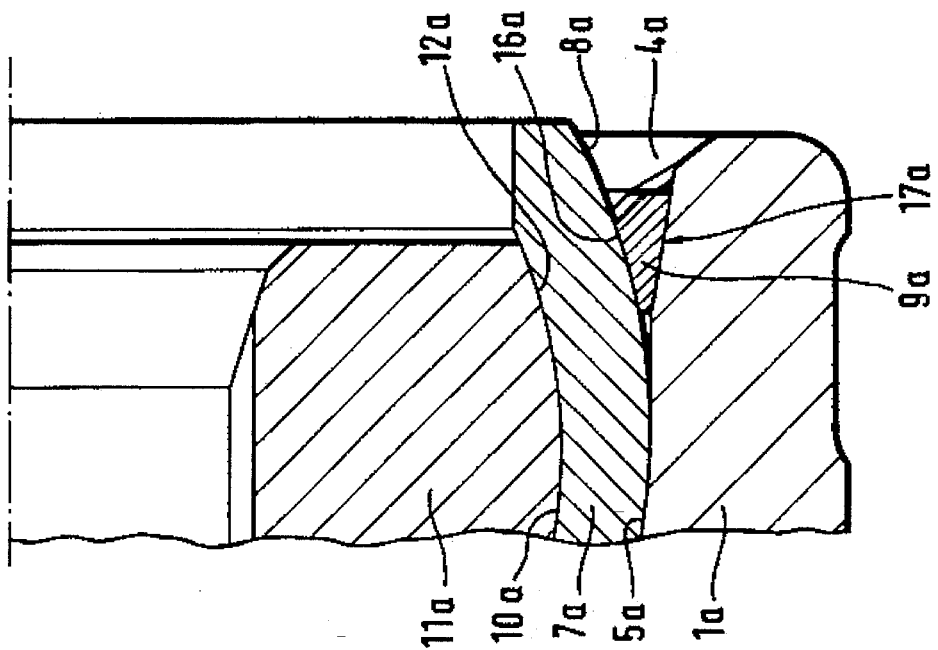
FIG. 4 is a longitudinal section view through a joint with a securing element according to FIG. 3.
Figure 3:
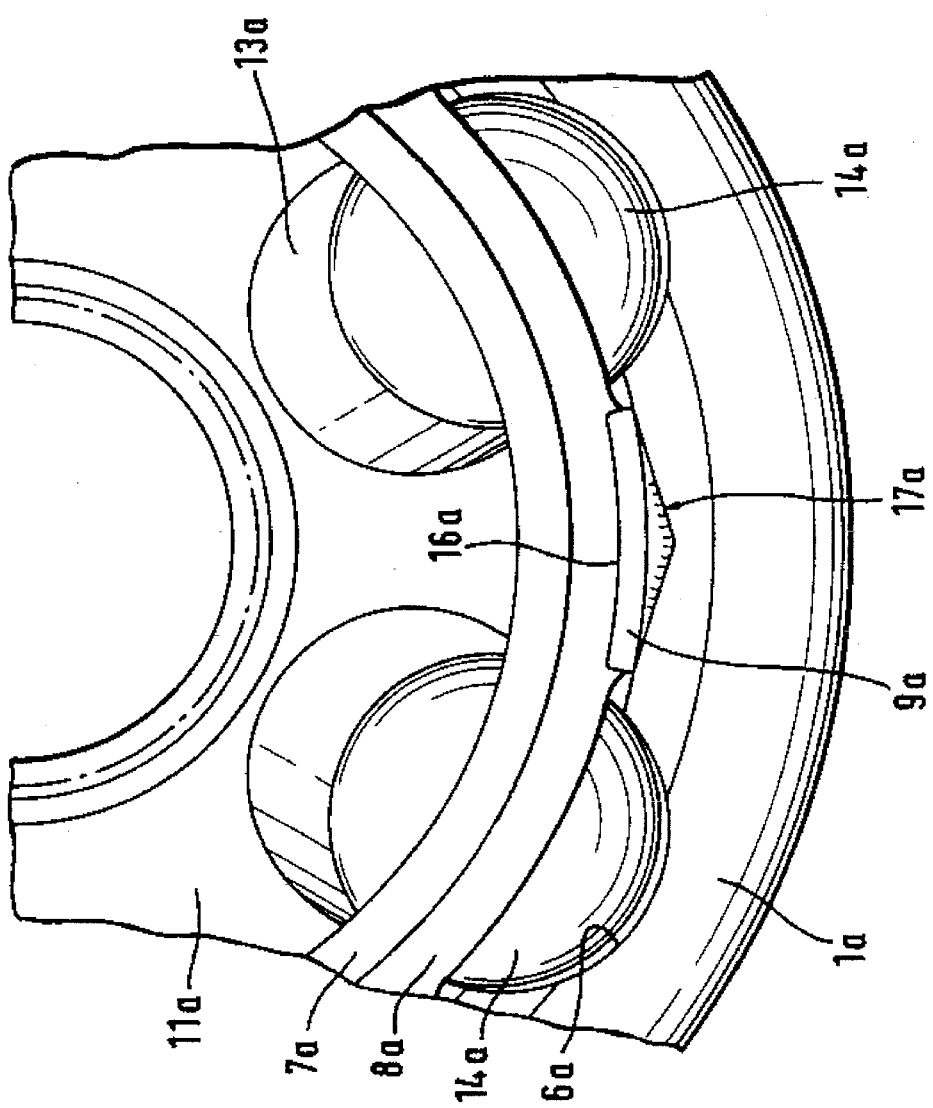
FIG. 3 is an axial view of a first embodiment of a securing element in accordance with the invention according to FIG. 1.

FIGS. 3 and 4 show the same details as FIGS. 1 and 2, but in an enlarged scale and with the same reference numbers.

Figure 6:
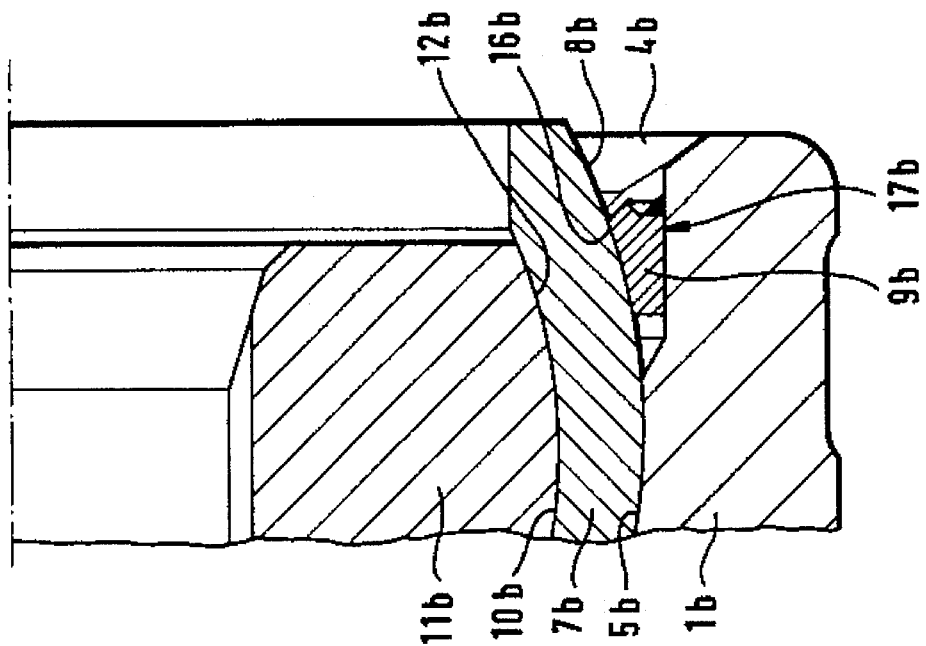
FIG. 6 is a longitudinal section view through the joint with a securing element according to FIG. 5.
Figure 5:
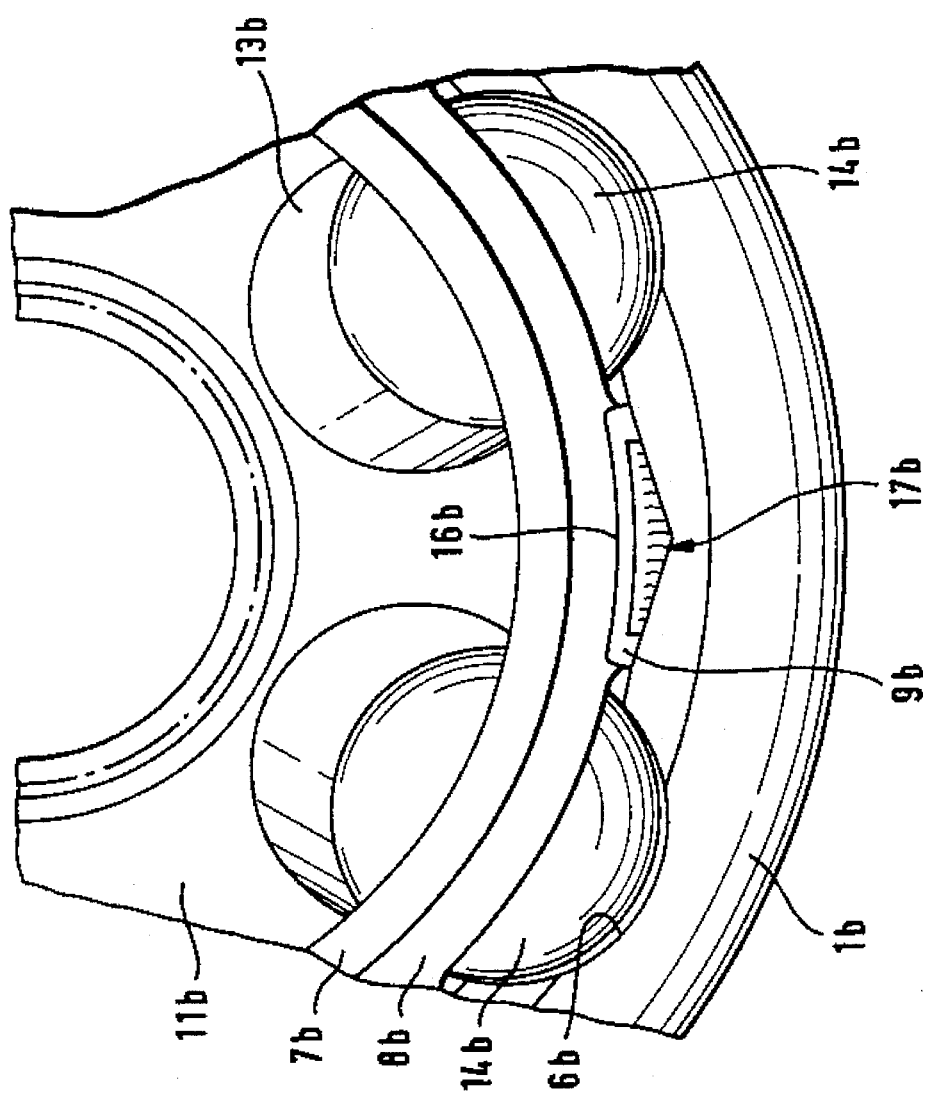
FIG. 5 is an axial view of a second embodiment of a securing element in accordance with the invention.

In FIGS. 5 and 6, any details corresponding to those of FIGS. 3 and 4 have been given the same reference numbers accompanied by the index "b". In deviating from FIGS. 3 and 4, if viewed in the longitudinal section, the grooves 17b with a wedge-shaped cross-section extend in an axis-parallel way with reference to their face of contact with the securing elements 9b.

Figure 8:
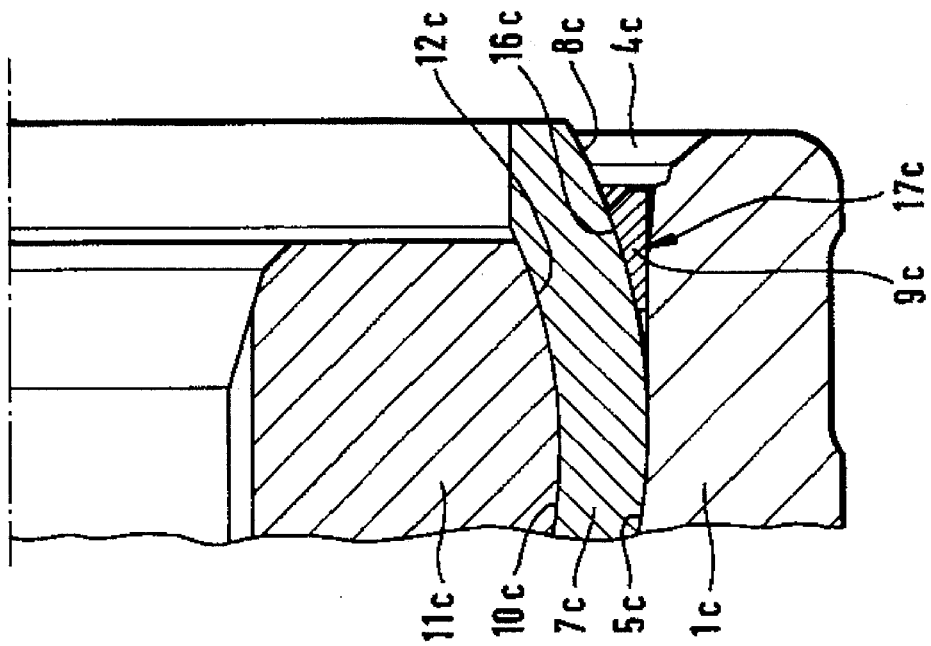
FIG. 8 is a longitudinal section view through a joint with a securing element according to FIG. 7.
Figure 7:
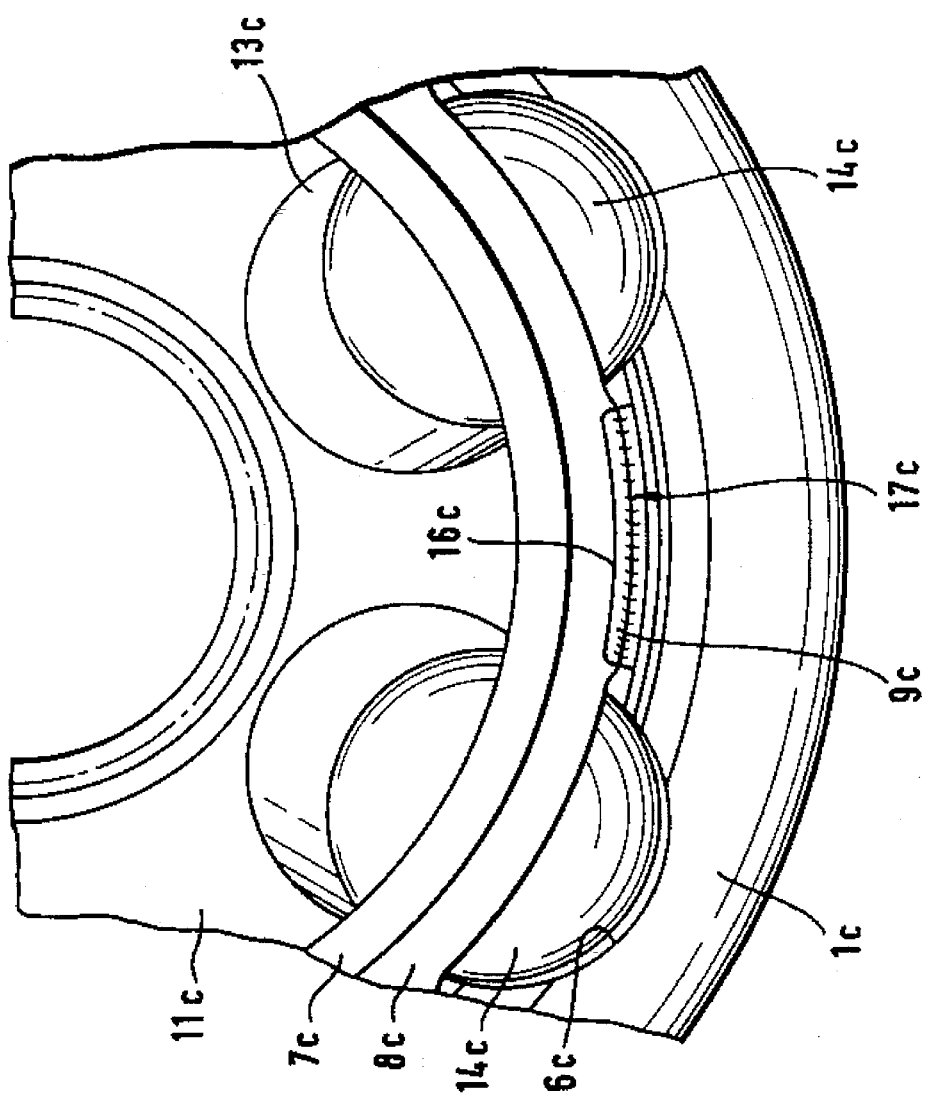
FIG. 7 is an axial view of a third embodiment of a securing element in accordance with the invention.

In FIGS. 7 and 8, any parts corresponding to those of FIGS. 3 and 4 have been given the same reference numbers accompanied by the index "c". As can be seen in FIG. 8, there is no special guiding groove for the securing elements 9c, which means that there are no special guiding means for the securing elements in the circumferential direction. In consequence, the outer joint part does not have to undergo any chip-forming machining operations.

Figure 10:
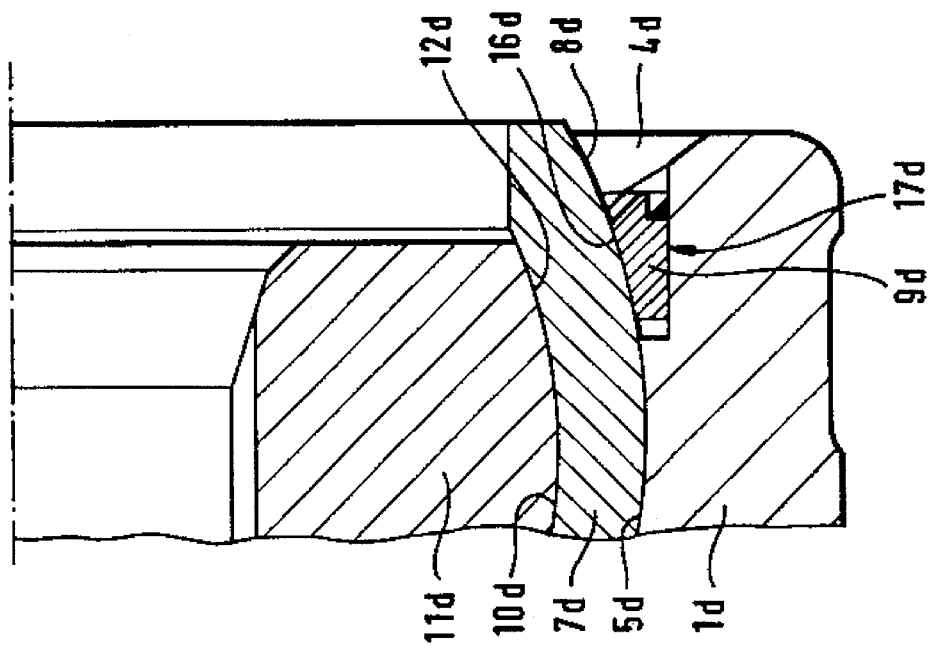
FIG. 10 is a longitudinal section view through the joint with a securing element according to FIG. 9.
Figure 9:
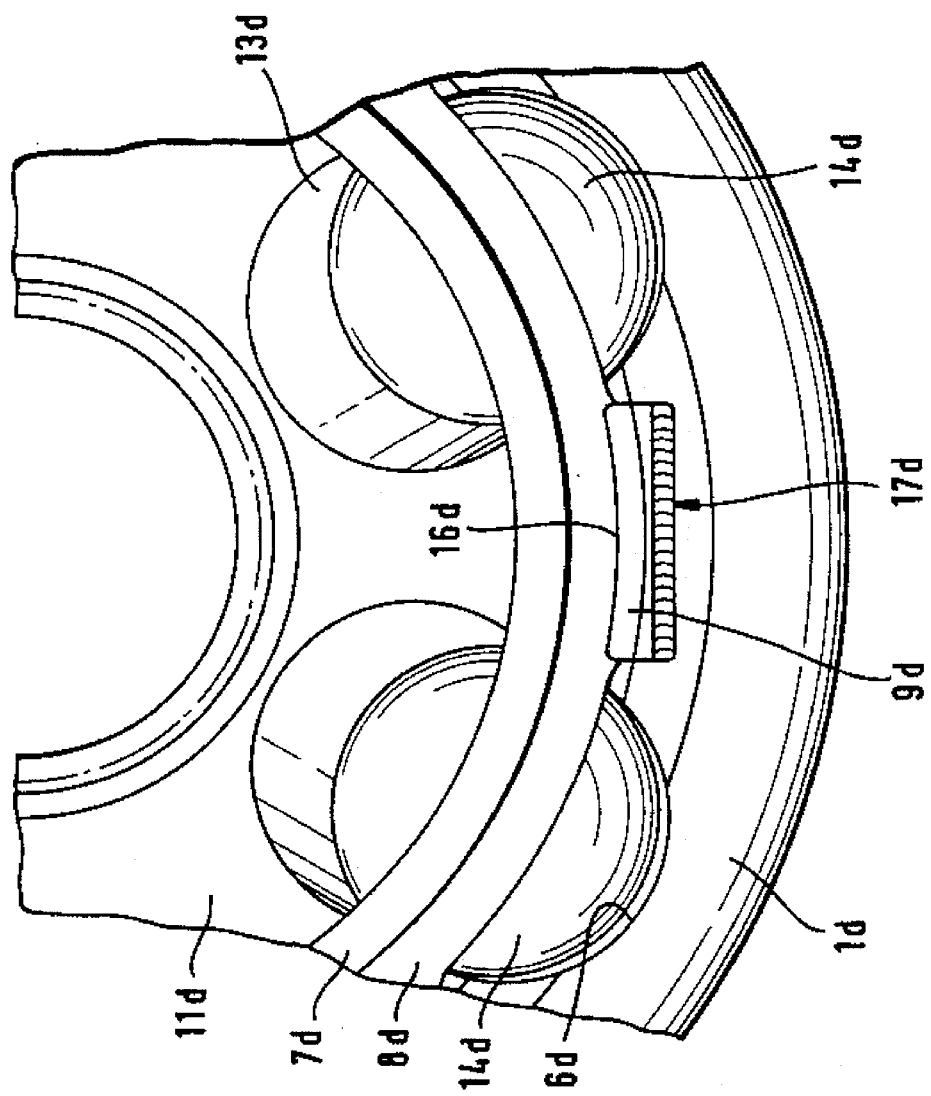
FIG. 9 is an axial view of a fourth embodiment of a securing element in accordance with the invention.

In FIGS. 9 and 10, any details corresponding to those of FIGS. 3 and 4 have been given the same reference numbers accompanied by the index "d". As can be seen in the axial view of FIG. 9, the guiding groove 17d for the securing elements 9d has been provided with a rectangular cross-section, and as can be seen in the longitudinal section, the groove—analogously to that shown in FIG. 4—extends in an axis-parallel way.

Figure 12:
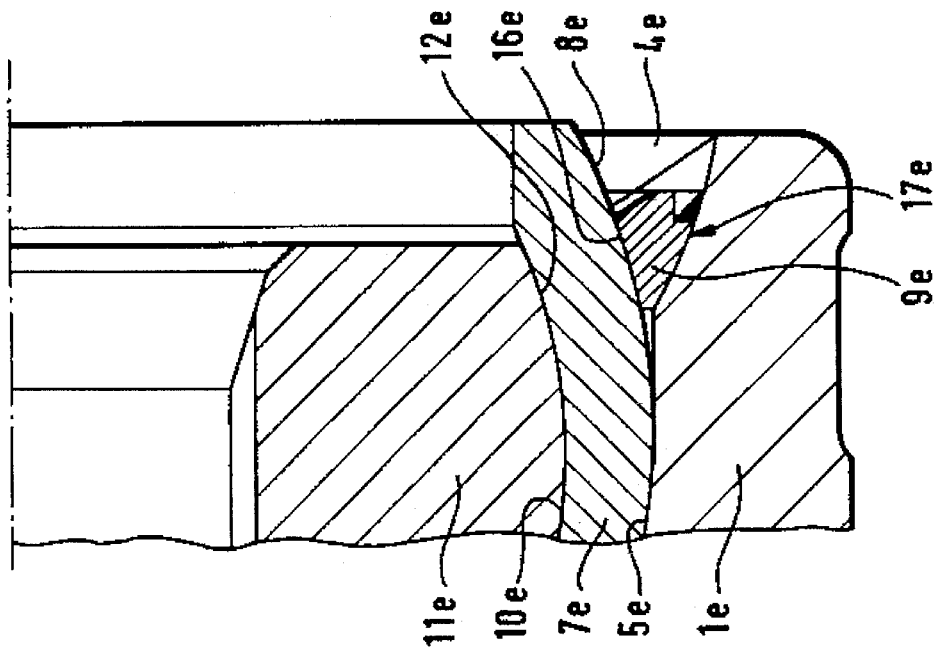
FIG. 12 is a longitudinal section view through the joint with a securing element according to FIG. 11.
Figure 11:
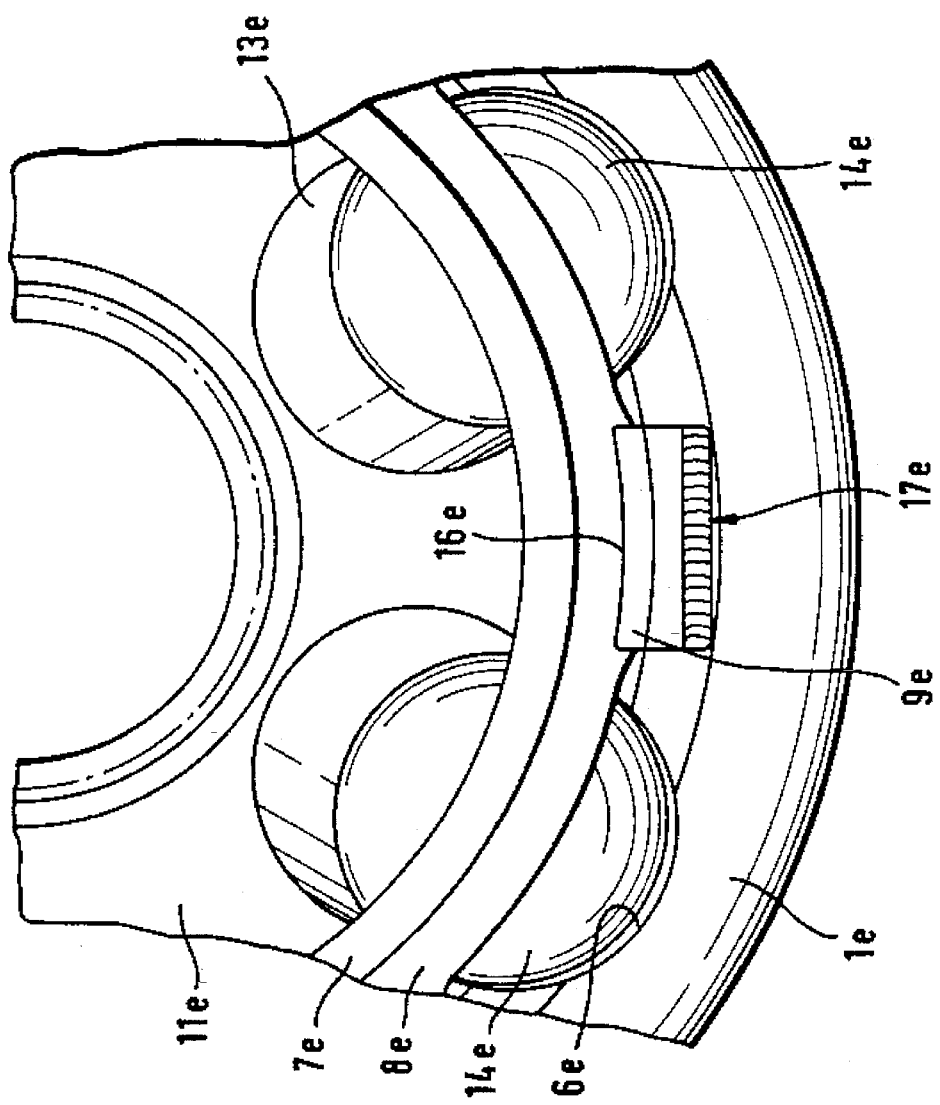
FIG. 11 is an axial view through a fifth embodiment of a securing element in accordance with the invention.

In FIGS. 11 and 12, any details corresponding to those of FIGS. 3 and 4 have been given the same reference number accompanied by the index "e". The guiding groove 17e deviates in that it has a rectangular cross-section, and in the longitudinal section according to FIG. 12, it describes a circular arch. As a result, the securing element 9e, when axially displaced, simultaneously approaches the cage 7e radially.

Figure 14:
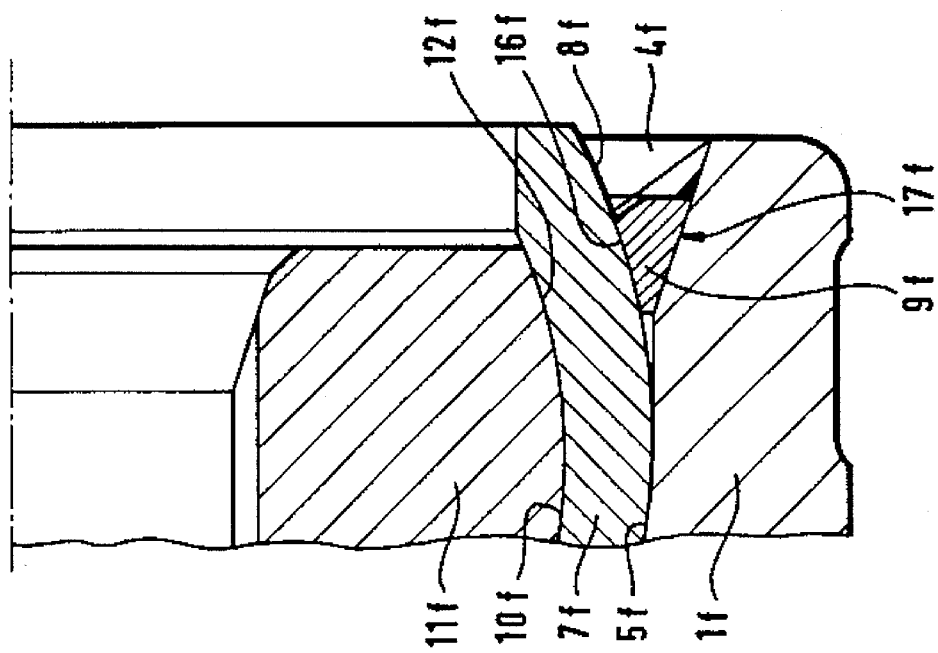
FIG. 14 is a longitudinal section view through the joint with a securing element according to FIG. 13.
Figure 13:
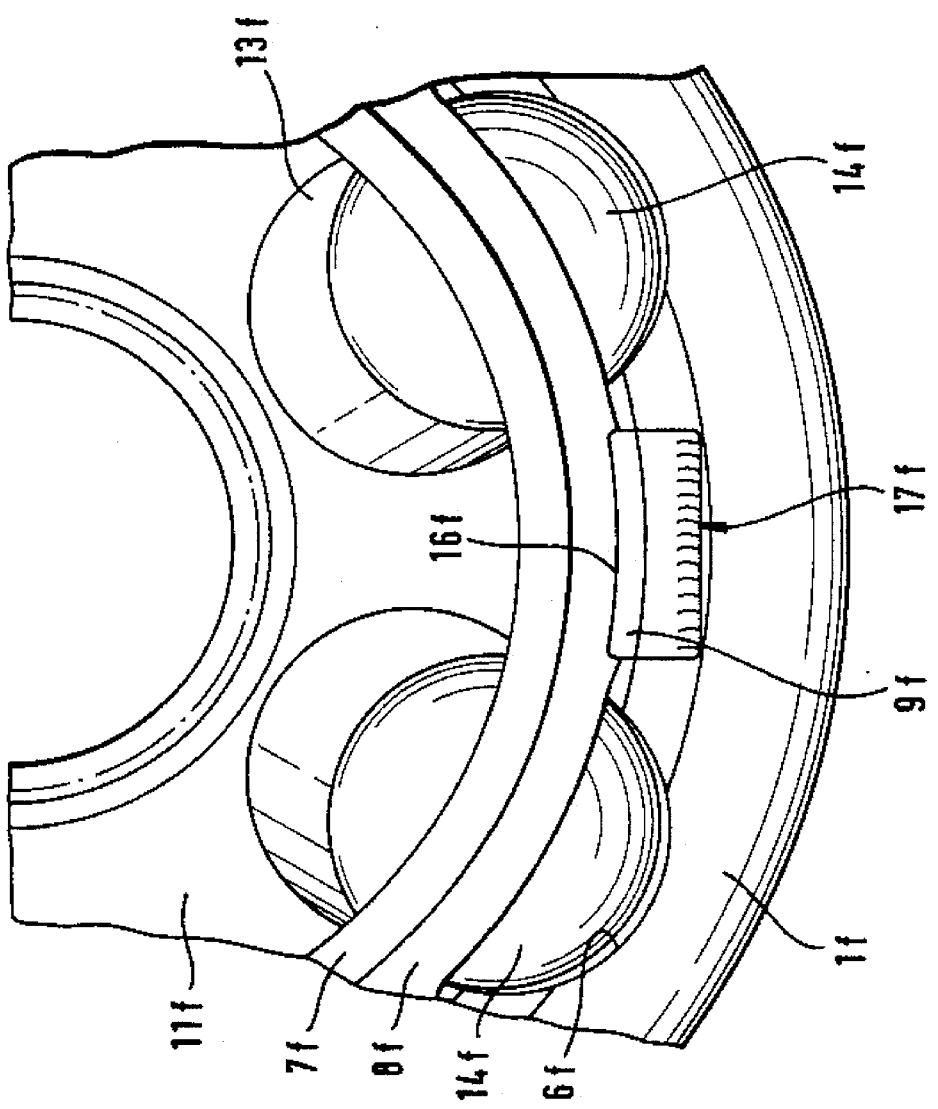
FIG. 13 is an axial view of a sixth embodiment of a securing element in accordance with the invention.

In FIGS. 13 and 14, any details corresponding to those of FIGS. 3 and 4 have been given the same reference numbers accompanied by the index "f". The groove 17f deviates in that it is shown with a rectangular cross-sections its axis and thus its base, see FIG. 14, extends towards the central axis of the joint at an angle. As a result, the securing element 9f, when axially displaced, simultaneously approaches the cage 7f radially.

Figure 16:
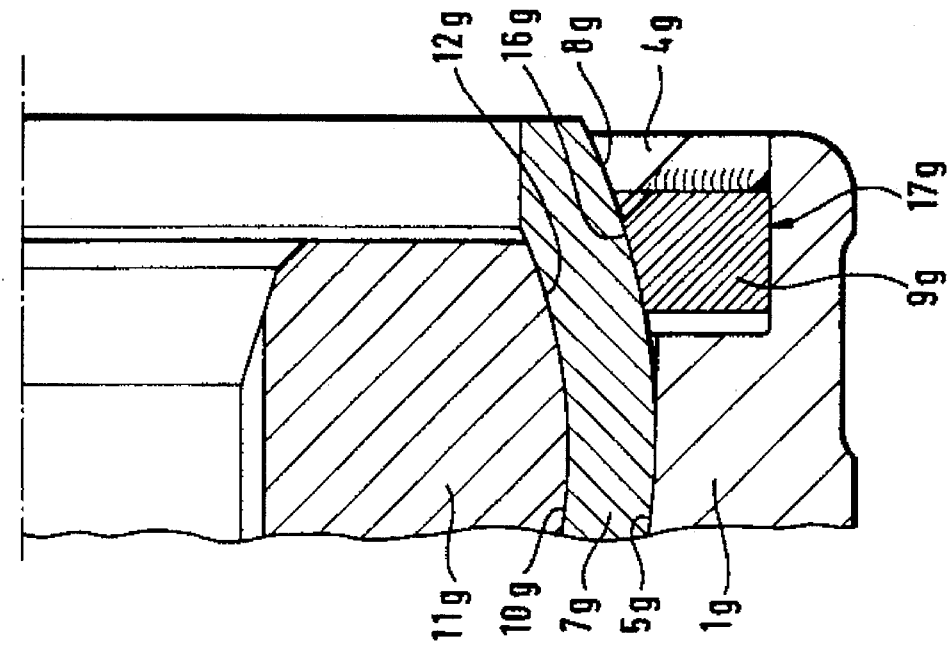
FIG. 16 is a longitudinal section view through the joint with a securing element according to FIG. 15.
Figure 15:
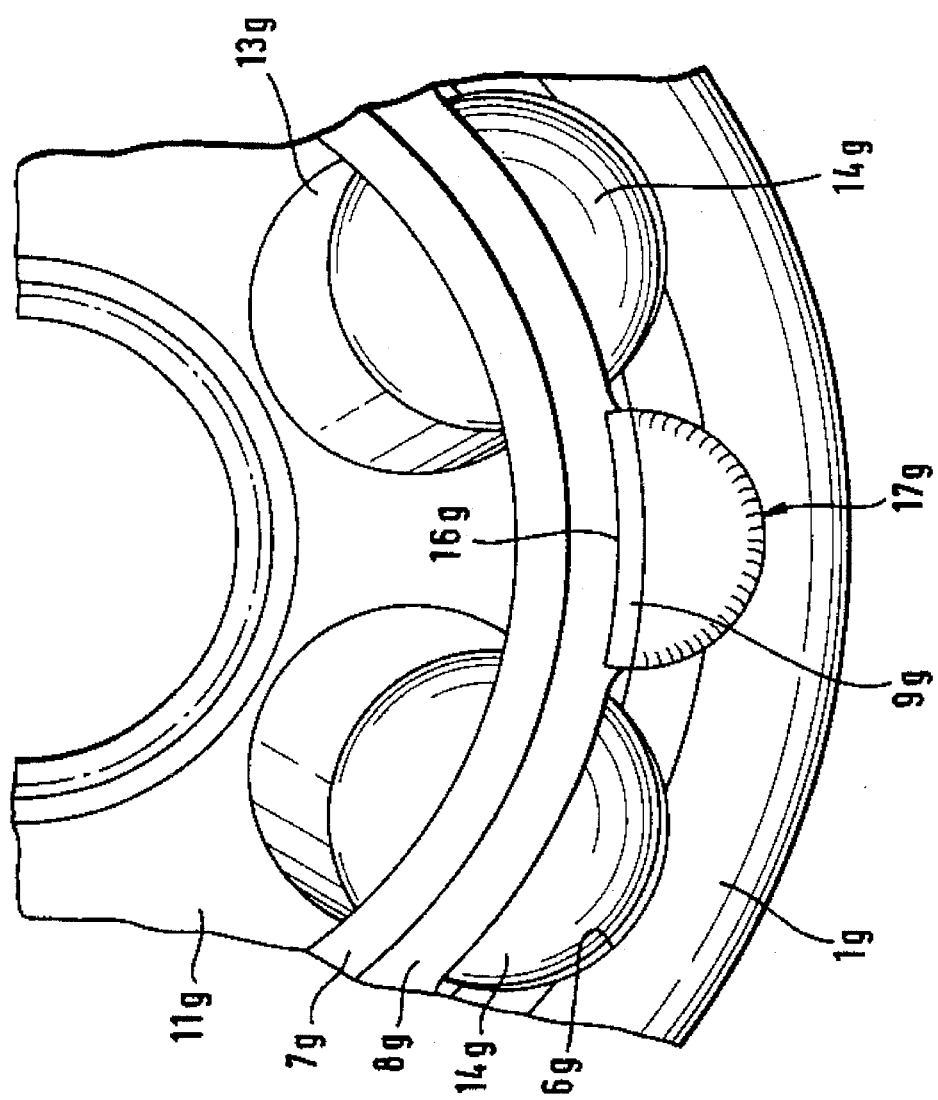
FIG. 15 is an axial view of a seventh embodiment of a securing element in accordance with the invention.

In FIGS. 15 and 16, any details corresponding to those of FIGS. 3 and 4 have been given the same reference numbers accompanied by the index "g". In FIG. 15, the securing element 9g is introduced into a guiding groove 17g whose cross-section is circular and limited and whose axis extends parallel to the joint axis. As can be seen in FIG. 16, the axial length of the guiding groove is such that for the purpose of adjusting the amount of play, the securing element, may be inserted with its inner face adapted to the cage 7g.

Figure 18:
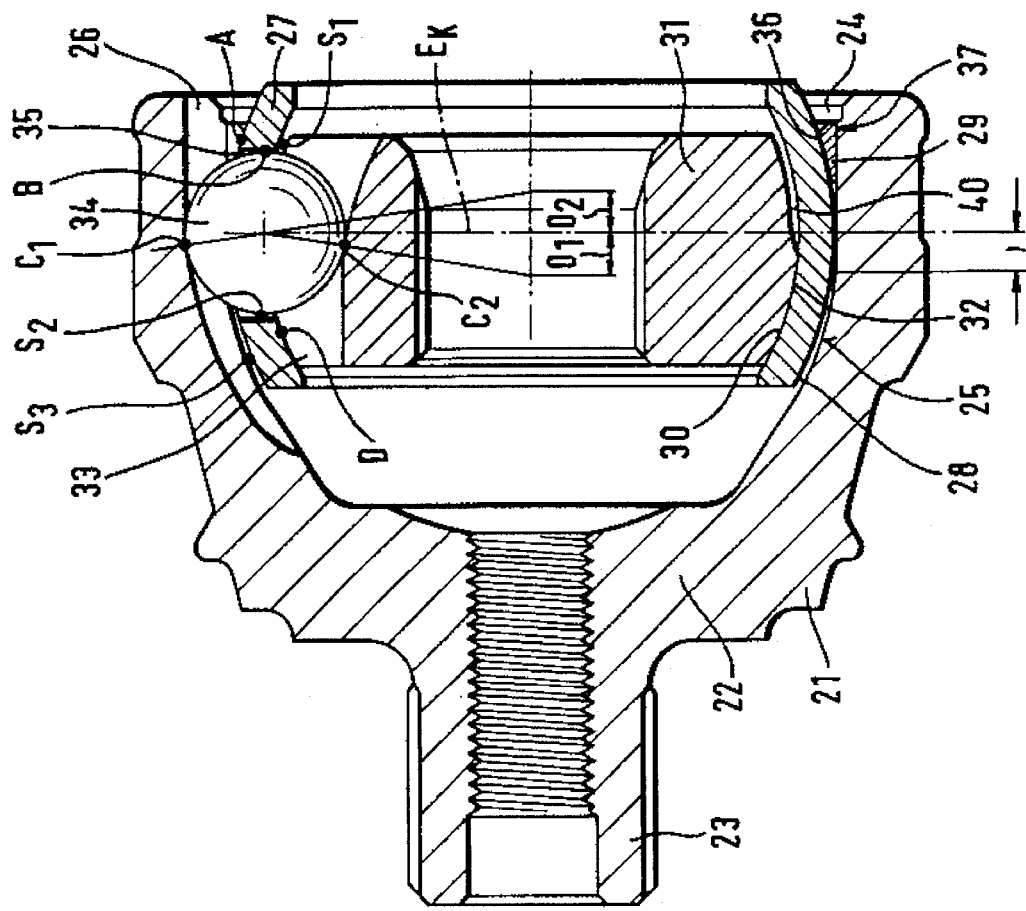
FIG. 18 is a longitudinal section view through a joint according to FIG. 17.
Figure 17:
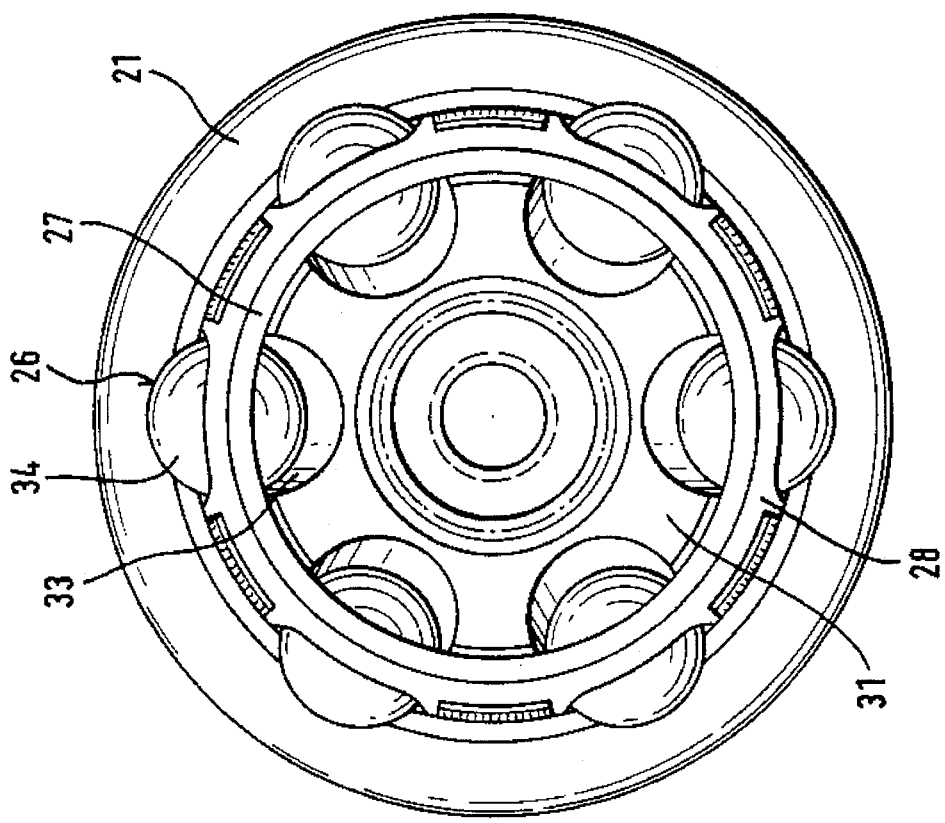
FIG. 17 is an axial view of a second embodiment of a joint in accordance with the invention.

FIGS. 17 and 18 show a joint which is slightly modified relative to that shown in FIGS. 1 and 2, and the reference numbers of any parts corresponding to those shown in FIGS. 1 and 2 have been increased by 20. The inner joint part deviates in that it includes a partially turned region which produces an annular gap 40 between the surface 32 of the inner joint part 31 and the inner spherical face 30 of the cage 27, thereby providing a radial play $S_1$. The spherical outer face 28 of the cage is held so as not to be in contact with the undercut-free inner face 25 of the outer joint part 21, as a result of which there is provided a radial play $S_3$. A sliding contact occurs on the outer face 28 of the cage 27 relative to the securing elements 29 only, in the contact points A. The cage 27 is indirectly supported axially inwardly relative to the outer joint part 21 by means of the outer spherical face 32 of the inner joint part in contact point D, the cage windows 35 in the contact points B on the balls 35 and the balls 34 which are supported in the tracks 26 and 33 of the outer joint part and inner joint part in the contact points $C_1$, $C_2$. When the balls 34 contact the contact points B of the cage windows, a play $S_2$ occurs at the opposite end.

$O_1$ refers to the so-called offset, the axial distance between the centre (not described in detail) of the radius of curvature of the tracks 33 in the inner joint part and the joint centre, a plane $E_K$ through the ball centres, and $O_2$ refers to the offset (optionally deviating from $O_1$) of the centre of the radius of curvature of the tracks 26 in the outer joint part relative to the joint centre, the plane $E_K$ through the ball centres of the extended joint. The inner face 25 of the outer joint part has a portion 2 extending cylindrically to the inside of the outer joint part 21 beyond the plane $E_K$ comprising the ball center.

FIGS. 19 and 20 show a joint which substantially corresponds to that shown in FIGS. 1 and 2 and in the case of which the guiding conditions for the cage are those shown in FIGS. 17 and 18. The reference numbers of any parts corresponding to those shown in FIGS 1 and 2 have been increased by 40. A further deviating feature as compared to the joint shown in FIGS. 17 and 18 consists in that the outer joint part 41 is produced as a deep-drawn part with a substantially uniform wall thickness, with the tracks 46 in the outer joint part being provided in form of radial formations 61. A shaft 62 is inserted into the inner joint part 51 and axially secured by a securing ring 63.

Constant Velocity Universal Ball Joint With Cage Securing Elements

List of reference numbers

| | | |
|---|---|---|
| 1, | 21, | 41 outer joint part |
| 2, | 22, | 42 joint base |
| 3, | 23, | 43 shaft journal |
| 4, | 24, | 44 joint aperture |
| 5, | 25, | 45 inner surface (outer joint part) |
| 6, | 26, | 46 ball track (outer joint part) |
| 7, | 27, | 47 cage |
| 8, | 28, | 48 outer surface of cage |
| 9, | 29, | 49 securing element (wedge) |
| 10, | 30, | 50 inner surface of cage |
| 11, | 31, | 51 inner joint part |
| 12, | 32, | 52 outer surface (inner joint part) |
| 13, | 33, | 53 ball track (inner joint part) |
| 14, | 34, | 54 ball |
| 15, | 35, | 55 cage window |
| 16, | 36, | 56 contact face (securing element) |
| 17, | 37, | 57 guiding groove for securing alement |
| 18 | | bore |
| 19 | | securing element (plug) |
| | 40, | 60 annular gap |
| | | 61 formation |
| | | 62 connected shaft |
| | | 63 securing ring |

We claim:

1. A constant velocity universal ball joint comprising an outer joint part with substantially longitudinally extending circumferentially distributed ball tracks;

an inner joint part with substantially longitudinally extending circumferentially distributed ball tracks, the outer and inner joint part tracks being arranged in pairs radially opposite one another and jointly receiving a torque transmitting ball;

a cage which receives the balls in circumferentially distributed windows which holds them in a common plane and which, upon articulation of the axes of the outer and inner joint parts, guides the balls on to the angle-bisecting plane, the outer joint part being produced with surfaces between the individual ball tracks, which, if viewed in the axial direction, constitute undercut-free inner surfaces;

at least three securing elements for the cage being inserted into the outer joint part between two neighboring ball tracks, respectively, being connected to the outer joint part and forming cage contact and cage guiding faces which counter-act an axial movement of the cage out of the outer joint part, the balls being able to move between the securing elements;

said securing elements are formed by wedges, independent of one another, which are axially inserted into an annular gap between the outer joint part and an outer face of the cage, which are fixed to the outer joint part at a desired position and which, with a set axial play, hold the cage in the outer joint part by means of contact points.

2. A joint according to claim 1, wherein the radii of curvature of the tracks are axially oppositely offset relative to a plane through the ball centers of the extended joint, the amount of an offset of the inner joint part being permitted to deviate from the amount of a second offset of the outer joint part.

3. A joint according to claim 1, wherein the inner surface between the tracks in the outer joint part forms second cage contact and guiding faces against which the cage, on contact points, is supported axially inwardly in the outer joint part.

4. A joint according to claim 3, wherein the inner joint part is axially inwardly supported in the outer joint part by means of its outer face on the inner face of the cage and that it is axially outwardly supported in the outer joint part by means of its tracks on the balls and thus indirectly by means of the balls and cage and by means of the securing elements.

5. A joint according to claim 3, wherein the inner joint part is axially inwardly and outwardly supported in the outer joint part, each in case by means of its outer face on the inner face of the cage, respectively, and thus indirectly by means of the cage.

6. A joint according to claim 3, wherein the cage is held in the outer joint part in a clearance-free way and that the balls are held in an almost radially clearance-free way in the tracks in the outer joint part and in the inner joint part.

7. A joint according to claims 3, wherein centers of the cage contact and cage guiding faces at the securing elements and in the outer joint part are axially offset in opposite directions relative to a plane through the ball centers of the extended joint and that their radii are greater than the radius of the outer face of the cage.

8. A joint according to claim 1 wherein there is radial play between the inner surface of the outer joint part between the tracks and the outer surface of the cage the inner surface of the cage is in contact with the outer surface of the inner joint part between the tracks in contact points and that the cage, by means of the cage windows, is axially inwardly supported on the balls in contact points on the flanks of the cage windows positioned towards the aperture of the outer joint part, said balls in turn being supported on the tracks of the outer joint part and of the inner joint part in contact points.

9. A joint according to claim 8, wherein between the inner surface of the cage and the outer surface of the inner joint part, at the end positioned towards an aperture of the outer joint part, there is provided a radial play.

10. A joint according to claim 8, wherein there exists an axial play between the balls and the flanks of the cage window positioned towards the inside of the outer joint part when the balls contact the contact points in the tracks in the contact points on the flanks of the cage windows positioned towards the aperture of the outer joint part.

11. A joint according to claim 1, wherein the inner surface of the outer joint part wall, in the region of a plane through the ball centers of the extended joint, beyond said plane into the inside of the outer joint part, includes an inner cylindrical portion.

12. A joint according to claim 1, wherein the outer joint part is provided with recesses which, in a circumferentially form-fitting way, are engaged by the securing elements.

13. A joint according to claim 12, wherein the outer joint part is provided with recesses and wherein the recesses permit the securing elements to be axially and/or radially displaced therein prior to the securing elements being fixed to the outer joint part.

14. A joint according to claim 1, wherein a radius of the cage contact and cage guiding faces of the securing elements is greater than the radius of the outer surface of the cage.

15. A joint according to claim 1, wherein the outer joint part is a formed plate metal part with a substantially constant wall thickness.

16. A method of producing a joint comprised of:
   providing an outer joint part with substantially longitudinally extending circumferentially distributed ball tracks;
   an inner joint part with substantially longitudinally extending circumferentially distributed ball tracks the tracks being arranged in pairs radially opposite one another and jointly receiving a torque transmitting ball;
   a cage which receives the balls in circumferentially distributed windows which holds them in a common plane and which, upon articulation of the axes of the outer and inner joint parts, guides the balls on to the angle-bisecting plane, the outer joint part being produced with surfaces between the individual ball tracks, which, if viewed in the axial direction, constitute undercut-free inner surfaces;
   at least three securing elements for the cage providing a preassembled assembly consisting of the inner joint part, cage and balls in predetermined positions with coaxially arranged axes of the inner joint part and the cage and coaxially introducing said assembly into the outer joint part and subsequently inserting and fixing the securing elements to the outer joint part.

17. A method according to claim 16, wherein with the outer joint part being axially supported, the securing elements are made to stop axially against the cage which is directly of indirectly supported on the outer joint part and that, in this position, they are fixed to the outer joint part.

18. A method according to claim 16, wherein with the outer joint part being axially held, the securing elements are made to stop axially against the cage which is directly or indirectly supported on the outer joint part the securing elements are then axially withdrawn from the axially held outer joint part by a defined amount and fixed to the outer joint part in this position.

19. A method according to claim 16, wherein the securing elements are welded to the outer joint member.

* * * * *

UNITED STATES PATENT AND TRADEMARK OFFICE
CERTIFICATE OF CORRECTION

PATENT NO. : 5,542,885
DATED : August 6, 1996
INVENTOR(S) : Werner Krude, Peter Harz It is certified that error appears in the above-indentified patent and that said Letters Patent is hereby corrected as shown below:

Column 3, line 32, after "joint" insert --. Their--

Column 3, line 42, after "part", delete ", said" and insert --. The--

Column 8, line 25, "alement" should be --element--

Column 9, line 44, Claim 10, "window" should be --windows--

Signed and Sealed this

Seventeenth Day of December, 1996

Attest:

BRUCE LEHMAN

Attesting Officer      Commissioner of Patents and Trademarks

UNITED STATES PATENT AND TRADEMARK OFFICE
CERTIFICATE OF CORRECTION

PATENT NO. : 5,542,885  Page 1 of 2
DATED : August 6, 1996
INVENTOR(S) : Werner Krude, Peter Harz It is certified that error appears in the above-indentified patent and that said Letters Patent is hereby corrected as shown below:

Column 8, line 63, Claim 1, after "points" insert --A--

Column 9, line 5, Claim 3, before "guiding" insert --cage--

Column 9, line 6, Claim 3, after "points" insert --E--

Column 9, line 19, Claim 6, delete "that"

Column 9, line 30, Claim 8, after "cage" insert --, wherein--

Column 9, line 32, Claim 8, after "points" insert --D,--

Column 9, line 32, Claim 8, delete "that" and substitute therefor --wherein--

Column 9, line 34, Claim 8, after "points" insert --B--

UNITED STATES PATENT AND TRADEMARK OFFICE
CERTIFICATE OF CORRECTION

PATENT NO. : 5,542,885
DATED : August 6, 1996
INVENTOR(S) : Werner Krude, Peter Harz It is certified that error appears in the above-indentified patent and that said Letters Patent is hereby corrected as shown below:

Column 9, line 37, Claim 8, after "points" insert --$C_1$, $C_2$--

Column 9, line 45, Claim 10, after "points" insert --$C_1$, $C_2$--

Column 9, line 46, Claim 10, after "points" insert --B--

Column 10, line 31, Claim 16, after "cage" insert --;--

Column 10, line 40, Claim 17, delete "of" and substitute therefor --or--

Column 10, line 45, Claim 18, after "joint part" insert --, wherein--

Signed and Sealed this

Fourth Day of March, 1997

*Attest:*

BRUCE LEHMAN

*Attesting Officer*  Commissioner of Patents and Trademarks